United States Patent
Cotton et al.

(10) Patent No.: US 7,492,822 B2
(45) Date of Patent: Feb. 17, 2009

(54) COMPRESSION TECHNIQUES

(75) Inventors: Andrew David Raine Cotton, Middlesex (GB); Michael James Knee, Petersfield (GB)

(73) Assignee: Snell & Wilcox Limited, Hampshire (GB)

( * ) Notice: Subject to any disclaimer, the term of this patent is extended or adjusted under 35 U.S.C. 154(b) by 584 days.

(21) Appl. No.: 10/502,630

(22) PCT Filed: Jan. 27, 2003

(86) PCT No.: PCT/GB03/00319

§ 371 (c)(1),
(2), (4) Date: Jan. 5, 2005

(87) PCT Pub. No.: WO03/063491

PCT Pub. Date: Jul. 31, 2003

(65) Prior Publication Data

US 2005/0111544 A1     May 26, 2005

(30) Foreign Application Priority Data

Jan. 25, 2002     (GB) .................................. 0201747.3

(51) Int. Cl.
*H04N 7/32*     (2006.01)

(52) U.S. Cl. ............................... 375/240.12; 375/240.2
(58) Field of Classification Search ............ 375/240.02, 375/240.18, 240.21, 240.24
See application file for complete search history.

(56) References Cited

U.S. PATENT DOCUMENTS 5,751,359 A     5/1998     Suzuki et al.

OTHER PUBLICATIONS

Erdem, et al., "Compression of 10-bit video using the tools of MPEG-2", Signal Processing. Image Communication, Elsevier Science Publishers, Amsterdam. vol. 7, No. 1, Mar. 1, 1995. pp. 27-56.
Symes, Peter, "Ten-Bit Processing in an 8-Bit Environment", SMPTE Journal. White Plains NY. No. 6, Jun. 1989. pp. 444-446.
PCT Search Report for Application WO 03/063491. Date of mailing: Aug. 25, 2003.

*Primary Examiner*—Gims S Philippe
*Assistant Examiner*—Erick Rekstad
(74) *Attorney, Agent, or Firm*—Pearl Cohen Zedek

(57) ABSTRACT

In a video encoder a prediction signal at a bit resolution of P is subtracted from an input signal received at a bit resolution of P+Δ, where P is typically 8 bits, and P+Δ, 10 bits. A transform is then performed on the result, the output of which transform being at a bit resolution of at least P+Δ. The transformed signal is quantised, and the quantised signal used to form the prediction signal. The quantised signal is then coded for downstream delivery. At a decoder, the process is inverted, preserving the extra Δ bits input to the encoder.

9 Claims, 3 Drawing Sheets

COMPRESSION TECHNIQUES

PRIOR APPLICATION DATA

The present application is a national phase application of International Application PCT/GB03/00319, entitled "IMPROVED COMPRESSION TECHNIQUES" filed on Jan. 27, 2003, which in turn claims priority from United Kingdom application 0201747.3, filed on Jan. 25, 2002, both of which being incorporated by reference in their entirety.

FIELD OF THE INVENTION

This invention is directed to methods of video signal compression, and in particular aspects, to methods of MPEG-2 compression.

BACKGROUND OF THE INVENTION

Various methods for the compression of video signals are known, employing various compression standards. The example will be taken here of the MPEG2 standard.

A common criticism of the MPEG2 standard is that it has only been specified to handle video signals at 8-bit resolution. However, more and more applications are demanding the use of video signals of higher bit resolution, particularly large screen applications where the "contouring" of 8-bit signals is especially visible.

Several systems have already been proposed that allow video signals having a larger resolution or data range to be passed through the 8-bit MPEG compression system. One such scheme proposes passing the 8 most significant bits of a higher bit depth video signal through a standard 8-bit MPEG encoder and passing two least significant bits through an additional uncompressed private data channel, multiplexed with the MPEG video and audio signals for transmission. The two LSBs are then re-combined with the 8-bit compressed video signal by a special decoder. However, this scheme does not function without the extra private data channel, which adds complexity.

An alternative approach has applied some non-linear "companding" to the input video that squeezes a 10-bit input signal in to an 8-bit data range, with greater precision being applied over the brightness ranges where contouring is most visible. However, such an approach is also incompatible with standard 8-bit components, in particular standard decoders, which do not support the inverse companding feature.

SUMMARY OF THE INVENTION

It is therefore an object of the invention to address these problems and to provide an improved method of video signal compression.

Accordingly, the present invention consists in one aspect in a method of video signal compression comprising the steps of: receiving a video signal input at a bit resolution of $P+\Delta$, where P and $\Delta$ are positive integers; subtracting a prediction signal at a bit resolution of P; performing a transform on the result, the output of which transform being at a bit resolution of at least $P+\Delta$; quantising the transformed signal to produce a quantised signal; utilizing the quantised signal to form the said prediction signal; and coding the quantised signal for delivery.

This technique allows video signals of a bit depth $\Delta$ greater than the standard to be passed through an MPEG compression chain, whilst maintaining compatibility with standard components. It requires no additional side-channel, all of the higher bit resolution data being carried in the standard video elementary stream. The resulting compressed bitstream is thus entirely compatible with standard 8-bit decoders, but when fed into a special decoder is able to produce an output of substantially higher resolution than the standard 8-bit output. In areas of lower complexity, the output pictures are practically indistinguishable from those of the original higher resolution source material. Furthermore, when employed with standard 8 bit decoders, rather than a special decoder, the system nevertheless produces an output having an appreciably greater resolution.

Preferably the method comprises performing the transform at a bit resolution of at least $Q+\Delta$, where Q is the minimum number of bits required in the transform domain to represent a video signal at bit resolution P, and quantising the transformed signal to produce a quantised signal of bit resolution Q.

In another aspect, the present invention consists in a method of video signal decompression, comprising the steps of: receiving a coded signal; decoding the coded signal; inverse quantising the decoded signal; performing an inverse transform on the inverse quantised signal, a first output of the inverse transform being provided at a first bit resolution and a second output of the inverse transform being provided at a second bit resolution greater than said first bit resolution; using the first output of the inverse transform to form a prediction signal at a bit resolution of P; and combining the second output and the prediction signal to form a video signal output at a bit resolution of $P+\Delta$, where P and $\Delta$ are positive integers.

In a further aspect, the present invention consists in a system for video signal compression and decompression comprising: a compressor for receiving a video signal input at a bit resolution of $P+\Delta$, where P and $\Delta$ are positive integers, subtracting a prediction signal at a bit resolution of P, performing a transform on the result, the output of which transform being at a bit resolution of at least $P+\Delta$, quantising the transformed signal to produce a quantised signal, utilizing the quantised signal to form the said prediction signal, and coding the quantised signal for delivery; a channel for delivering the coded signal; and a decompressor for receiving the coded signal, decoding the coded signal, inverse quantising the decoded signal, performing the inverse of said transform on the inverse-quantised signal, a first output of the inverse transform being provided at a bit resolution of $P+\Delta$, and a second output of the inverse transform being provided at a bit resolution of P, the output of the inverse transform additionally including sign bits where appropriate, utilizing the second output of the inverse transform to form a prediction signal at a bit resolution of P and combining the prediction signal with the first output of the inverse transform to form a video signal of bit resolution $P+\Delta$.

Preferably, the compressor is adapted to perform the transform at a bit resolution of at least $Q+\Delta$, where Q is the minimum number of bits required in the transform domain to represent a video signal at bit resolution P, and to quantise the transformed signal to produce a quantised signal of bit resolution Q.

Suitably, the decompressor is adapted to inverse quantise the decoded signal to produce an inverse-quantised signal at a bit resolution of at least $Q+\Delta$.

DESCRIPTION OF THE DRAWINGS

The invention will now be described by way of example with reference to the accompanying drawings, in which.

DETAILED DESCRIPTION OF THE INVENTION

Figure 1A:
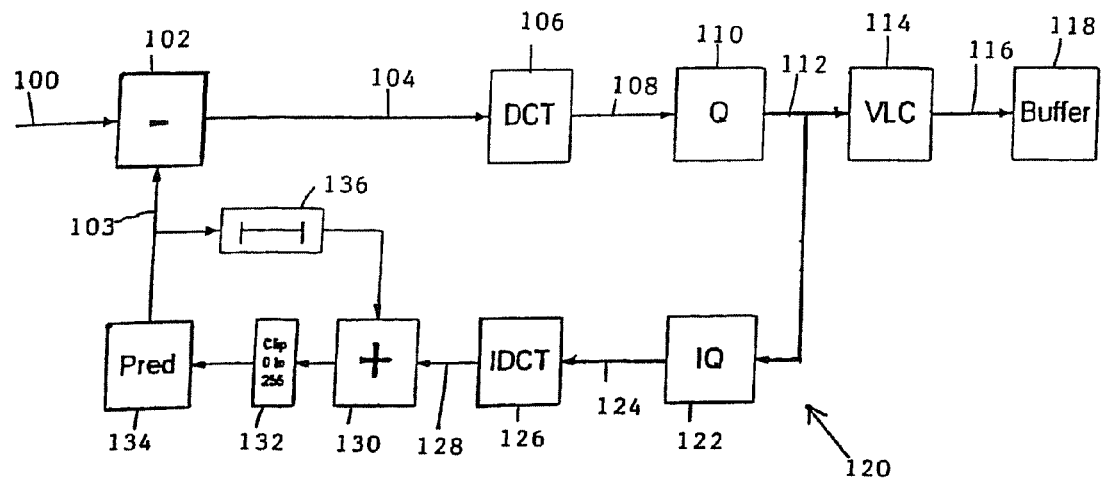
FIGS. 1a and 1b are diagrams illustrating a coder and decoder, respectively, according to the prior art.
Figure 1B:
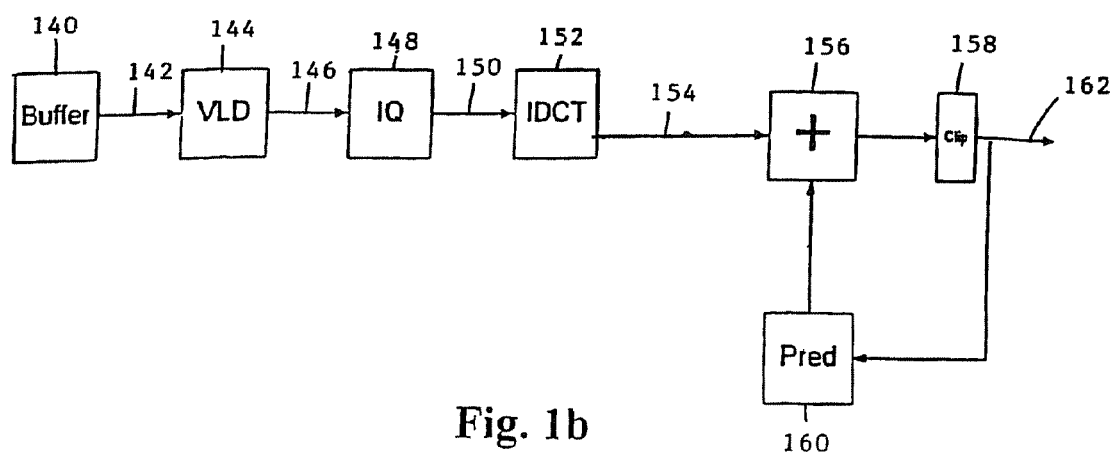

Referring initially to FIG. 1, there is provided a simplified block diagram of a standard 8 bit MPEG encoder and decoder. The input 8 bit video (100) is passed to the subtractor (102) whose other input is the prediction signal (103). The difference signal, at 9 bits, (104) is then passed to the DCT (106). The transformed signal, at 12 bits, (108) is quantised (110), producing the 12 bit output (112) required for the variable length coder, or "VLC" (114). The output of the quantiser (112) also feeds the prediction loop (120). The encoded output (116) of the VLC (114) is then typically passed to a buffer (118) before transmission.

At the decoder, the incoming bitstream (116) is typically buffered (140) before being variable length decoded by a VLD (142). The decoded output (146) at 12 bits is inverse quantised (148) and inverse transformed (152) to produce a 9 bit signal (154) which is added (156) to the prediction formed at (160) and clipped (158) to produce the 8 bit video output (162).

This invention in one aspect exploits the fact that although MPEG2 is specified to support 8-bit video signals, the DCT coefficient data that passes through the compressed stream is to 12 bit (11 bit plus one sign bit) accuracy. A detailed mathematical analysis will show that indeed for an 8-bit "baseband" video signal to pass transparently through the DCT (106) and IDCT (152) at least 11 bits of accuracy are required in the transform domain. However, as MPEG codes prediction errors, or difference signals, in P & B pictures an additional bit of dynamic range is required for sign, hence the 12 bit (11 bit plus one sign bit) path through the VLC (114) and VLD (142).

However, further mathematical study will show that these 11 bits (and one sign bit) of accuracy are only required for very complex input signals. Where the video signal is less complex, in for instance plain areas of the picture, the additional accuracy in the transform domain can be exploited to code the input video at a higher resolution. Fortunately it is exactly these plain areas of the picture where the contouring of an 8-bit video signal is most visible.

Figure 2:
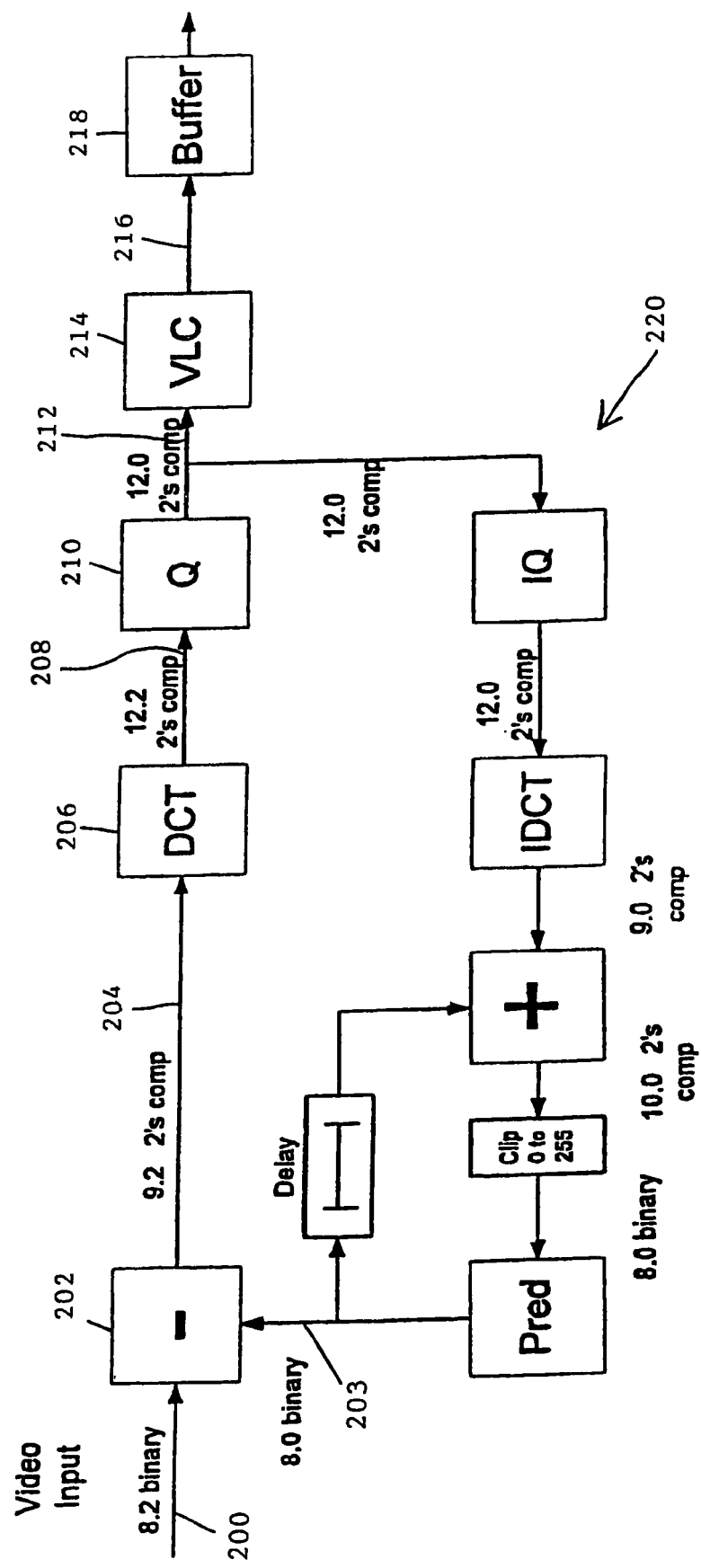
FIG. 2 is a diagram illustrating an encoder according to an embodiment of the invention.

FIG. 2 illustrates an MPEG encoder according to the invention. Here, the example is taken of a 10 bit system; it should be noted that higher bit ranges could be employed by devices according to the invention.

Signal bit widths and formats are marked on the connections between the functional blocks. For instance, "8.2 binary" is the bit width of the video input (200)—the notation indicates that the signal comprises the usual 8-bit video signal plus two additional fractional bits, giving a total of 10-bits. The 8 bit prediction signal (203) is subtracted (202) from the 10 bit video input (200), and the additional two accuracy bits are carried right through the subtractor (202), DCT (206) and in to the quantiser (210). The output (212) of the quantiser must be the standard MPEG 12.0 bits 2's complement, in order for the VLC (214) codewords to be compatible with 8-bit decoders. However, this is still sufficient to re-produce a near 10-bit video output at the decoder. Within the local decoder loop (220) of the encoder, the Inverse Quantiser and Inverse DCT are typically identical to those found within a standard 8-bit decoder, in order to ensure that the 10-bit encoder's prediction loop contains identical data to a standard 8-bit decoder. If this were not the case and the additional accuracy bits were carried through to the encoder's predictor, the "drift" between the 10-bit encoder and 8-bit decoder's prediction loops would be clearly visible in the decoded pictures.

The output (216) of the encoder according to this embodiment of the invention is thus entirely compatible with a standard 8-bit decoder, in contrast to those systems of the art described. However, it should also be noted that the output is also compatible with any intervening MPEG infrastructure, such as multiplexers, bitstream stores and switchers, as there is no extra data channel to be provided for.

Figure 3:
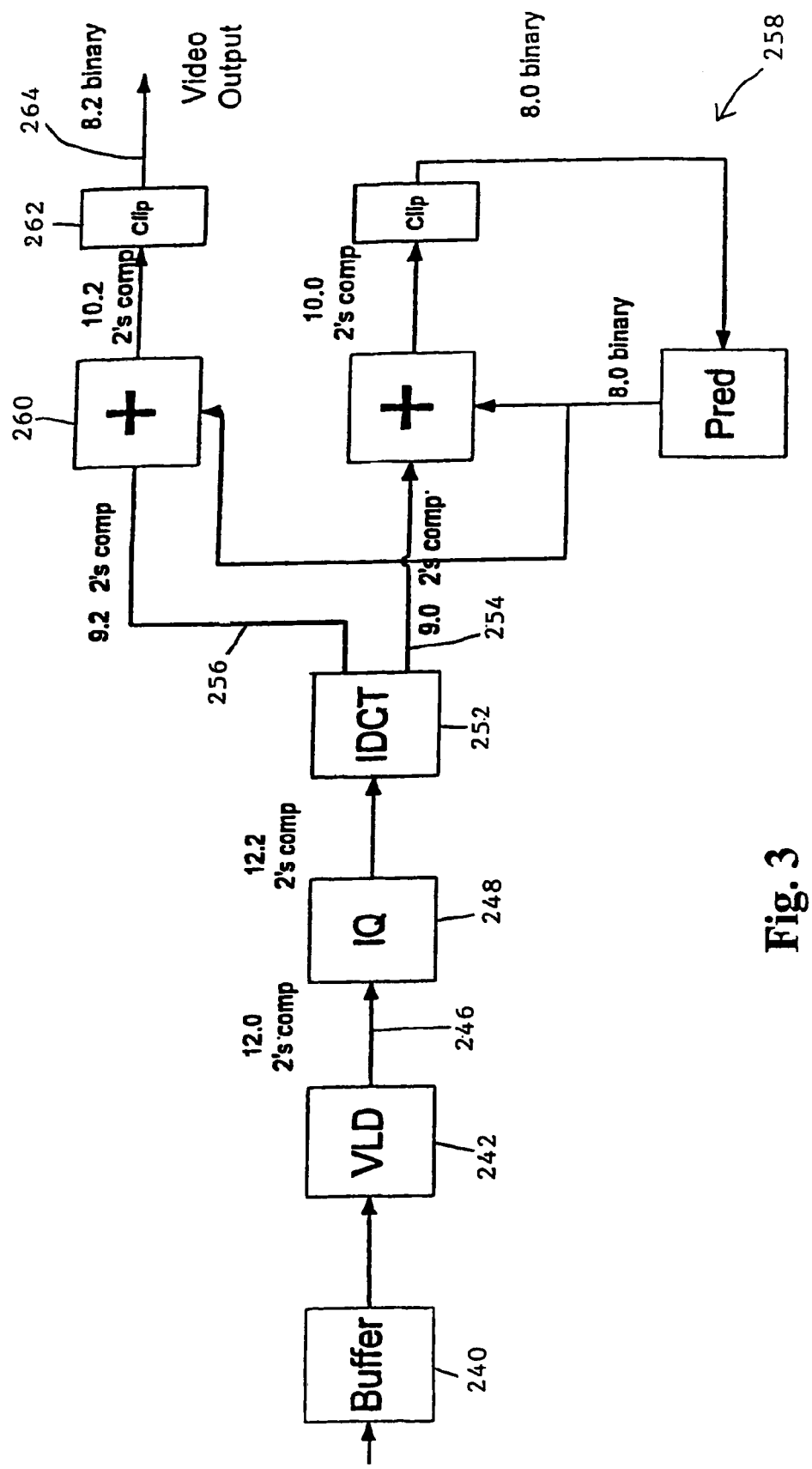
FIG. 3 is a diagram illustrating a decoder according to an embodiment of the invention.

As shown in FIG. 3, the incoming bitstream is decoded (242), producing the 12.0 bit input (246) for the Inverse Quantiser (248). The 10-bit decoder according to this embodiment requires a special Inverse Quantiser (248) and Inverse DCT (252). The Inverse Quantiser is required to provide a 12.2 bit output, rather than the standard 12.0 bit output. It follows that the IDCT input must also support 12.2 bits rather than 12.0 bits. However, as well as increased accuracy, the IDCT function is also required to provide two outputs—a standard 9.0 bit output (254) to feed the local decoder prediction loop (258) and a second 9.2 bit output (256) to feed the 10-bit video output. Simply further rounding the 9.2 bit output to 9.0 bits is insufficient, as the cascaded rounding process gives a substantially different result from rounding directly from the internal accuracy of the IDCT to 9.0 bits. As in the case of the encoder, in order to maintain 8-bit/10-bit compatibility, it is important to ensure that the decoder prediction loop operates in exactly the same manner as a standard decoder.

By carrying the two additional accuracy bits from the inverse quantiser (248), through the inverse DCT (252), the adding of the prediction signal (260) and the clipper (262) to the video output (264), it is possible to decode the signal to produce an output approaching the original 10-bit video signal input, virtually duplicating it in areas of lower complexity. The observed output picture material removes the contouring present in plain areas of a standard 8-bit codec, and any highly complex areas of the picture, though not re-produced at the 10-bit resolution, are not readily observed as being of lower resolution, due to the complexity of the picture.

It has also been noted by the inventors that still greater accuracy and higher resolution may be obtained by varying the quantiser visibility weighting matrix used, and hence the coarseness of the quantisation. For example, better results are often obtained by using a low weighting matrix value (MPEG permits values as low as 1), though these typically produce higher bit rates. It is theoretically possible in such cases for the quantiser output to exceed the 12 bit range permitted by the VLC (214). This can be prevented by, for example, artificially increasing the quantiser step size for particular macroblocks giving rise to such violations, or by clipping the DCT coefficients.

It will be appreciated by those skilled in the art that the invention has been described by way of example only, and a wide variety of alternative approaches may be adopted.

The invention claimed is:

1. A method of video signal compression comprising the steps of:
   receiving a video signal input at a bit resolution of $P+\Delta$, where P and $\Delta$ are positive integers;
   subtracting a prediction signal at a bit resolution of P;
   performing a transform on the result, the input to which transform being at a bit resolution of at least $P+\Delta$ plus any sign bit;

quantising the transformed signal to produce a quantised signal;
utilizing the quantised signal to form the said prediction signal; and
coding the quantised signal for delivery.

2. A method of video signal compression comprising the steps of:
receiving a video signal input at a bit resolution of P+Δ, where P and Δ are positive integers;
subtracting a prediction signal at a bit resolution of P;
performing a transform on the result, the output of which transform being at a bit resolution of at least P+Δ;
quantising the transformed signal to produce a quantised signal;
utilizing the quantised signal to form the said prediction signal; and
coding the quantised signal for delivery,
further comprising performing the transform at a bit resolution of at least Q+Δ, where Q is the minimum number of bits required in the transform domain to represent a video signal at bit resolution P, and quantising the transformed signal to produce a quantised signal of bit resolution Q.

3. A method of video signal decompression, comprising the steps of:
receiving a coded signal; decoding the coded signal;
inverse quantising the decoded signal;
performing an inverse transform on the inverse quantised signal, a first output of the inverse transform being provided at a first bit resolution and a second output of the inverse transform being provided at a second bit resolution greater than said first bit resolution;
using the first output of the inverse transform to form a prediction signal at a bit resolution of P; and
combining the second output and the prediction signal to form a video signal output at a bit resolution of P+Δ, where P and Δ are positive integers.

4. A method according to claim 1, wherein bit resolution P is 8 bit resolution, and resolution P+Δ is 10 bit resolution.

5. A system for video signal compression and decompression comprising:
a compressor for receiving a video signal input at a bit resolution of P+Δ, where P and Δ are positive integers, subtracting a prediction signal at a bit resolution of P, performing a transform on the result, the output of which transform being at a bit resolution of at least P+Δ, quantising the transformed signal to produce a quantised signal, utilizing the quantized signal to form the said prediction signal, and coding the quantised signal for delivery;
a channel for delivering the coded signal; and
a decompressor for receiving the coded signal, decoding the coded signal, inverse quantising the decoded signal, performing the inverse of said transform on the inverse-quantised signal, a first output of the inverse transform being provided at a bit resolution of P+Δ, and a second output of the inverse transform being provided at a bit resolution of P, the output of the inverse transform additionally including sign bits where appropriate, utilizing the second output of the inverse transform to form a prediction signal at a bit resolution of P and combining the prediction signal with the first output of the inverse transform to form a video signal of bit resolution P+Δ.

6. A system according to claim 5, wherein the compressor is adapted to perform the transform at a bit resolution of at least Q+Δ, where Q is the minimum number of bits required in the transform domain to represent a video signal at bit resolution P, and to quantise the transformed signal to produce a quantised signal of bit resolution Q.

7. A system according to claim 6, wherein the decompressor is adapted to inverse quantise the decoded signal to produce an inverse-quantised signal at a bit resolution of at least Q+Δ.

8. A system according to claim 5, wherein bit resolution P is 8 bit resolution, and resolution P+Δ is 10 bit resolution.

9. A method according to claim 3, wherein bit resolution P is 8 bit resolution, and resolution P+Δ is 10 bit resolution.

* * * * *